United States Patent [19]

Shimoda et al.

[11] Patent Number: 4,762,400

[45] Date of Patent: Aug. 9, 1988

[54] FERROELECTRIC LIQUID CRYSTAL ELECTRO-OPTICAL DEVICE HAVING HALF-SELECT VOLTAGE TO MAXIMIZE CONTRAST

[75] Inventors: Sadashi Shimoda; Takamasa Harada; Masaaki Taguchi; Kokichi Ito, all of Tokyo, Japan

[73] Assignee: Seiko Instruments Inc., Tokyo, Japan

[21] Appl. No.: 54,739

[22] Filed: May 27, 1987

[30] Foreign Application Priority Data

May 27, 1986 [JP] Japan ............................... 61-121861

[51] Int. Cl.[4] ............................................ G02F 1/13

[52] U.S. Cl. ................................ 350/350 S; 350/333

[58] Field of Search ...................... 350/332, 333, 350 S

[56] References Cited

U.S. PATENT DOCUMENTS

| | | | |
|---|---|---|---|
| 4,508,429 | 4/1985 | Nagae et al. | 350/350 S |
| 4,548,476 | 10/1985 | Kaneko | 350/350 S |
| 4,655,561 | 4/1987 | Kanbe et al. | 350/333 X |
| 4,668,051 | 5/1987 | Mourey et al. | 350/350 S |
| 4,707,078 | 11/1987 | Geary | 350/350 S X |

*Primary Examiner*—Stanley D. Miller
*Assistant Examiner*—Richard Gallivan
*Attorney, Agent, or Firm*—Bruce L. Adams; Van C. Wilks

[57] ABSTRACT

A ferroelectric liquid crystal electro-optical device driven in time-sharing comprising; a ferroelectric liquid crystal layer having bi-stable alignment characteristics, means for converting the bi-stable alignment state to optical ON state or optical OFF state, a matrix electrode and means for driving the liquid crystal layer by applying voltages to the liquid crystal layer through the matrix electrode. A voltage sufficient to change a stable alignment state of the ferro-electric liquid crystal molecular is applied to a selected pixel, a voltage insufficient to change a stable alignment state is applied to a non-selected pixel and an AC voltage for holding a stable alignment state is applied to a half-selected pixel. A bias value, which is the ratio of the amplitude of the voltage applied to the selected pixel to the amplitude of the AC voltage applied to the half-selected pixel, is set near the maximum value of B satisfying the following formula $$B/(B-2) \geqq Vsat/Vth,$$

wherein Vsat is the minimum value of voltage which enables to change a stable alignment state to the other state and Vth is the maximum value of voltage which enables to hold the stable alignment state.

12 Claims, 3 Drawing Sheets

FERROELECTRIC LIQUID CRYSTAL ELECTRO-OPTICAL DEVICE HAVING HALF-SELECT VOLTAGE TO MAXIMIZE CONTRAST

BACKGROUND OF THE INVENTION

This invention relates to an electro-optical conversion device for mutually changing over the bi-stable state of a ferroelectric liquid crystal and driving the same. More particularly, the present invention contemplates to drive most suitably the electro-optical conversion device described above. The electro-optical device according to the invention may be utilized as a display device, an optical shutter for a printer or the else.

There has been known in the past a ferroelectric liquid crystal electro-optical device of the driving system which changes over the bi-stable state of a ferroelectric liquid crystal by a pulse having a peak value above a threshold voltage to drive the liquid crystal and holds the bi-stable state after switching by an A.C. pulse. Such a device is described, for example, in the article of SID'85 Int'l Symposium 16, 131(1985).

First of all, the structure of a conventional ferroelectric liquid crystal cell (hereinafter called the "liquid crystal cell") is shown in FIG. 2. Reference numeral 1-1 represents a pair of substrates that are arranged to face each other. Reference numeral 3 represents a thin film of a ferroelectric liquid crystal such as a chiral smectic C liquid crystal (hereinafter called "SmC*") sandwiched between the substrates 1-1.

Reference numeral 2-2 represents uniaxial and random horizontal orientation films that exist on the interfaces between the substrates 1-1 and the SmC* thin films and accomplish the bi-stable state of liquid crystal molecules. The major axes of the liquid crystal molecules (hereinafter called the "molecular axes") extend horizontally with respect of the substrate 1 and form a layer. When observed from the top, the liquid crystal molecules are divided into two domains. In the first domain, the molecular axes are inclined by $+\theta$ relative to the normal 4 of the layer. This is the first stable state 5. Spontaneous polarization 7 of the liquid crystal molecules faces upward. The second domain is inclined by $-\theta$ relative to the normal 4 of the layer. This is the second stable state 6.

At this time spontaneous polarization 7 faces downward. Either one of these bi-stable state is selected by positive and negative A.C. pulses by utilizing the property of spontaneous polarization 7 that its direction is opposite under the bistable state. Reference numeral 8-8 represents a pair of polarizers arranged with their axes of polarization crossing each other perpendicularly. They distinguish optically the bi-stable state by birefringence. For example, they convert the first stable state to a light cut-off state (hereinafter called "black") and the second stable state to a light transmission state (hereinafter called "white"). Reference numerals 9 and 10 represent matrix electrodes for applying driving voltages to the SmC* thin film 3. As shown in FIG. 3, reference numeral 9 represents scanning electrodes (hereinafter called "strobe") and 10 does signal electrodes (hereinafter called "signal").

FIG. 4 shows a driving waveform applied to one matrix pixel (hereinafter called "dot") in line-sequence driving by use of an A.C. bias averaging method. Positive and negative (with reference to the strobe 9) pulses $P_1$ and $P_2$ having peak values above a threshold voltage are applied continuously during the selection period in a first frame. The liquid crystal molecules are aligned to the second stable state by the positive pulse $P_1$ and switched and aligned to the first stable state by the subsequent negative pulse $P_2$. This period is called the "selection period". This state is held by the application of A.C. pulses consisting of subsequent pulses $P_3$ and $P_4$ because the peak values of the A.C. pulses are below the threshold value. This state is called the "half-selection state". Therefore, black as the first stable state is written in the first frame. In the subsequent second frame, white is written because the polarity of the pulse is opposite. However, in the drawing, white is not written because $P_5$ and $P_6$ are below the threshold value, and black that has been written in the first frame is held as such. The period of $P_5$ and $P_6$ is called the "non-selection period". FIG. 4B shows the result of measurement of the change of the transmission light intensity at this time measured by a photomultiplier.

Here, the peak values of the pulses of the selection period $P_1$ and $P_2$, the half-selection period $P_3$ and $P_4$ and the non-selection period $P_5$ and $P_6$ are selected so as to satisfy the following relationship with V representing the absolute value of the pulses $P_1$ and $P_2$:

$$|P_3| = |P_4| = V/N,$$

$$|P_5| = |P_6| = V.(B-2)/B$$

where B is a bias value.

When driving time-divisionally a heretofore known twisted nematic liquid crystal, there is known a voltage averaging method proposed by Alt and Pleshko (IEEE Trans. Ed, 1974, ED21, pp 146–155). They proposed also the optimum driving condition in this method.

However, this method cannot be applied to SmC* for the following reason. Namely, though the change of transmission light intensity of the twisted nematic liquid crystal depends on the effective voltage value, the SmC* liquid crystal depends on the absolute value of the voltage. Therefore, the driving method as well as the circuit are different between them and the driving conditions change naturally, too.

No report has been made to this date on the optimum driving condition when SmC* is driven time-divisionally, and it has been difficult to represent the optimum condition when driving SmC practically.

SUMMARY OF THE INVENTION

The present invention is directed to solve the problem of the prior art technique described above, and selects the maximum bias value B within the allowable range of a liquid crystal material so as to minimize the ratio B/(B−2) between the peak values V.B/B of the pulses $P_1$ and $P_2$ during the selection period and the peak values V·(B−2)/B of the pulses $P_5$ and $P_6$ during the non-selection period as the optimum driving condition, that is, the condition for obtaining the maximum contrast.

DETAILED DESCRIPTION OF THE INVENTION

Figure 4A:
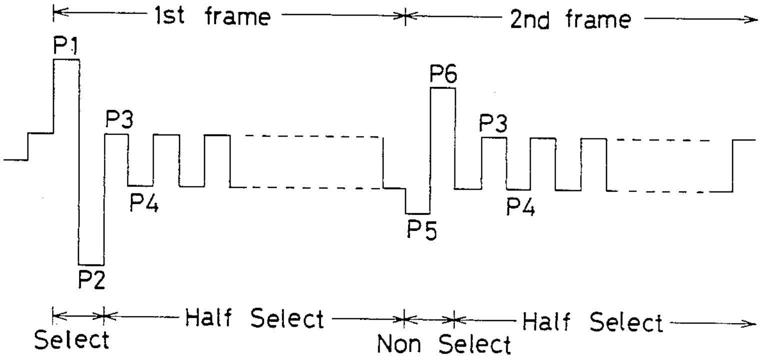
FIGS. 4A and 4B are diagrams showing the driving waveform and transmission light characteristics of the conventional liquid crystal cell.

In the waveforms shown in FIG. 4A, the peak values of the pulses $P_1$, $P_2$, $P_3$, $P_4$, $P_5$ and $P_6$ are V, V/B, V·(B−2)/B as described above. The relationship between these values and the characteristics of SmC* will be described with reference to FIG. 1.

Figure 1:
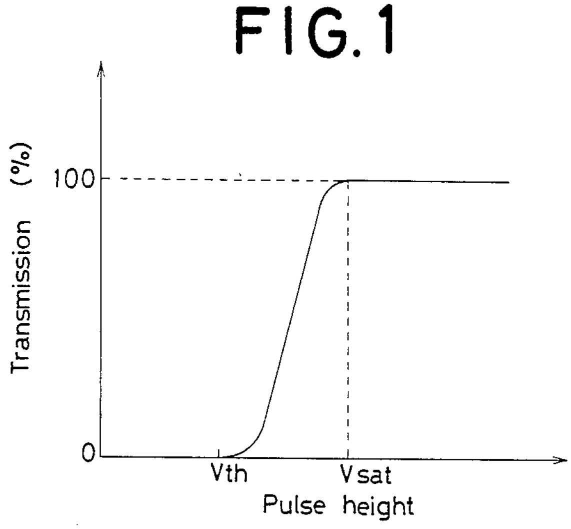
FIG. 1 is a diagram showing the relationship between the pulse peak value of a liquid crystal and its transmission light intensity.
Figure 2:
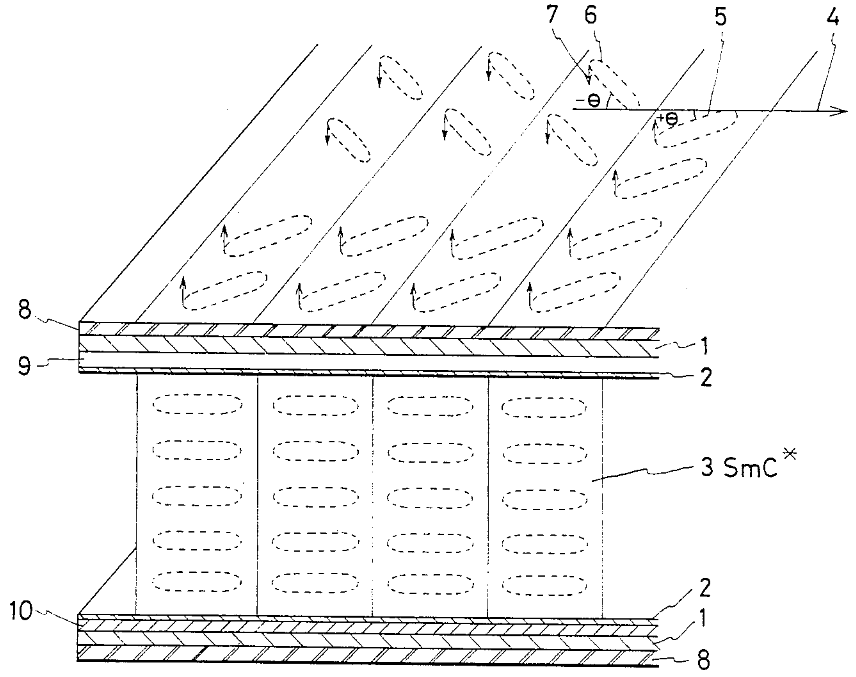
FIG. 2 is a perspective view of a conventional liquid crystal cell.
Figure 3:
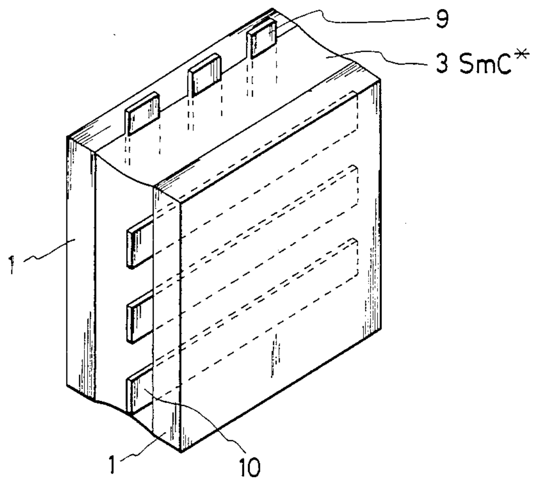
FIG. 3 is a perspective view showing the arrangement of the electrodes of the conventional liquid crystal.

In FIG. 1, as the pulse height increases, the stable state is switched from the first state to the second state as described already and hence the transmission light intensity changes, too. It will be hereby assumed that a voltage for holding the first stable state is a threshold voltage $V_{th}$ and the minimum voltage for changing to the second stable state is $V_{sat}$. These voltages $V_{th}$ and $V_{sat}$ are inherent to a given liquid crystal and change in accordance with its constant of elasticity and viscosity. Here, since the pulses $P_1$ and $P_2$ are those which change the stable state as described already, their maximum pulse peak values must be selected to the voltage $V_{sat}$. On the other hand, since the pulses $P_5$ and $P_6$ are pulses below the threshold voltages, their maximum pulse peak values must be selected to the voltage $V_{th}$.

In other words, SmC* can be driven in the waveform shown in FIG. 4A if the following relationship is satisfied:

$$V_{sat}/V_{th} \leqq B/(B-2) \ldots \quad (1)$$

Figure 5:
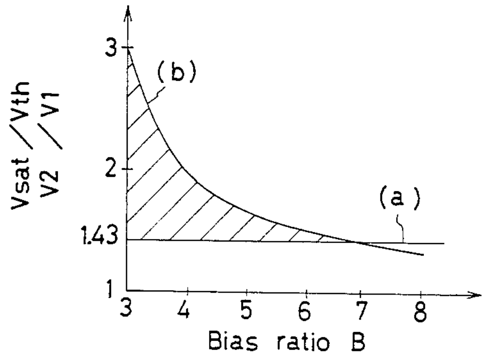
FIG. 5 is a diagram showing the relationship between $V_2/V_1$ and a bias value B.

The ratio Vsat/Vth is hereinafter called "threshold sharpness". If B=4, for example, an SmC* liquid crystal material having the characteristics $V_{sat}/V_{th} \leqq 2$ must be used. In practice, it becomes more difficult to prepare the SmC* liquid crystal satisfying this condition with a greater B value. FIG. 5 shows the result of measurement of the relationship of the formula (1) when a SmC* liquid crystal consisting of a pneylpyrimidine type compound as its principal component, for example. Solid line (a) represents the measured value of the right side of the formula (1) and $V_{sat}/V_{th}=1.43$. In the calculation formula on the right side, on the other hand, solid line (b) represents the value when the B value is changed. In FIG. 5, the range satisfying the formula (1) is represented by oblique lines. It can be understood that the bias value B must be below 6.

Figure 4B:
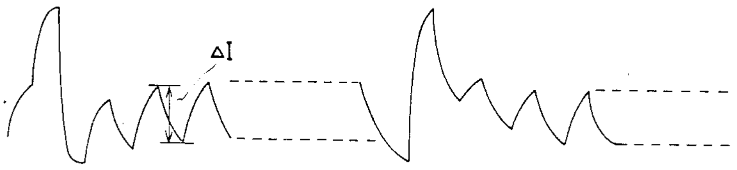
Figure 6:
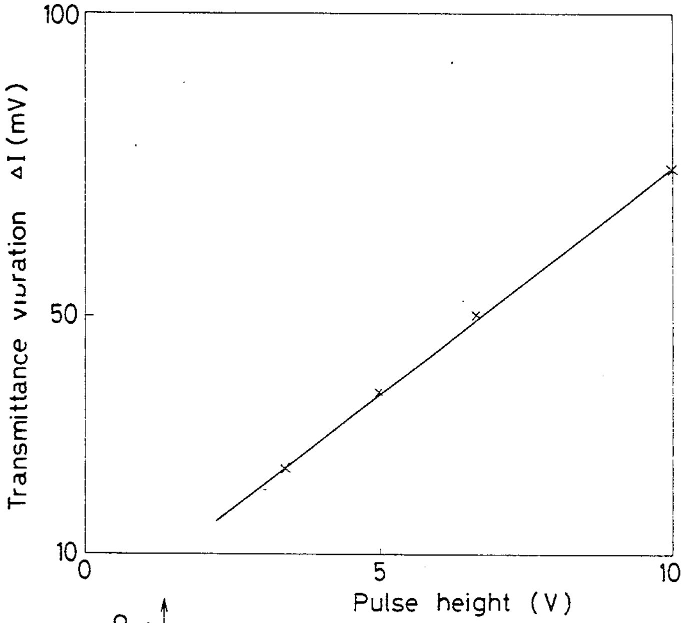
FIG. 6 is a diagram showing the result of measurement of fluctuation of transmission light intensity when an A.C. pulse below a threshold voltage is applied.

Next, contrast under this state will be explained. FIG. 6 shows the change of the transmission light intensity when an A.C. pulse having a peak value below the threshold voltage $V_{th}$ shown in FIG. 1 is applied to SmC*. It is to be hereby noted that FIG. 1 merely shows the voltage characteristics when the first stable state changes to the second stable state and the transmission light intensity changes even below the threshold voltage $V_{th}$. In other words, the transmission light intensity increases instantaneously when the voltage below $V_{th}$ is applied but returns to the original stable state after the application of the pulse. This is represented by fluctuation ΔI of the transmission light intensity during the half-selection period shown in FIG. 4B. This is a great difference from a twisted nematic liquid crystal.

It can be understood from FIG. 6 that the higher the voltage of the A.C. pulse, the greater the fluctuation ΔI of the transmission light intensity. This fluctuation ΔI of the transmission light intensity. This fluctuation ΔI of the transmission light intensity results in the drop of contrast. Namely, when the frequency of the fluctuation ΔI is set to a level above the frequency at which human eyes notice flicker, the mean value of the change of ΔI is noticed as the transmission light intensity by the human eyes. The greater the fluctuation ΔI, the greater becomes the mean value. At this time, the black level comes close to the white level whereas the white level comes close to the black level, on the contrary, so that the contrast ratio defined by their ratio drops.

Therefore, fluctuation ΔI must be made zero in order to make the contrast ratio the greatest. As can be understood from FIG. 6, this fluctuation ΔI depends on the pulse peak value; hence, the pulse peak value may be decreased. Since this pulse peak value, that is, the peak values of the pulses $P_3$ and $P_4$ applied in the half-selection period shown in FIG. 4A, are V/B as described already, B must be increased in order to reduce this value.

Figure 7:
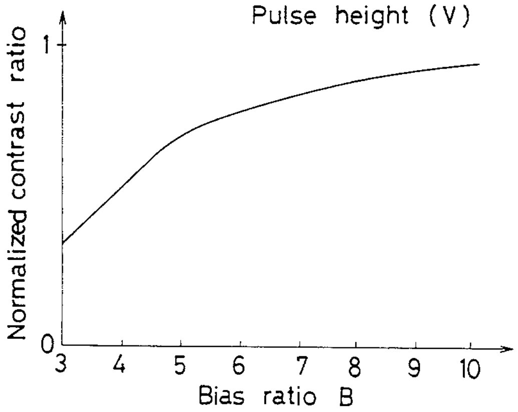
FIG. 7 is a diagram showing the result of measurement of dependence of a contrast ratio on the bias value.

FIG. 7 shows the result of measurement of the dependence of the contrast ratio on this bias value B. The contrast ratio 1 represents an ideal contrast ratio, and it can be understood that the contrast ratio decreases with a smaller bias value B. Therefore, if the bias value B is made great, the contrast comes closer to the maximum.

However, the bias value B is limited by the formula (1) as described already and cannot be increased unlimitedly. Therefore, the optimum driving condition of a given liquid crystal material is obtained by selecting the greatest numeric value of the bias value B within the range of the bias value B satisfying the formula (1). It can be understood that in the case of the SmC* liquid crystal consisting principally of the phenylpyrimidine type compound shown in FIG. 5, for example, the bias value B must be 6. A threshold characteristics similar to that shown in FIG. 1 exists in case of change the second stable state to the first stable state too. If the threshold sharpness value in case of the change is different from the value in case of FIG. 1, it is preferable to choose the large one.

Referring now to setting a bias over the above peak value satisfying the formula (1): In FIG. 1, the minimum voltage Vsat and the threshold voltage Vth are difined as voltages at 100% and 0% of the transmission light intensity respectively. The difinition of the minimum voltage Vsat and the threshold voltage Vth must not be the voltages at 100% and 0% of the transmission practically. Even if Vsat and Vth are difined as voltages at 90% and 10% of the transmission respectively, it is possible to drive the ferro-electric liquid crystal for an electro-optical device except the contrast is low. The nearer each of Vsat and Vth is to a voltage at 50% of the transmission, the lower the contrast of the device is. The ferro-electric liquid crystal electro-optical device having a driving waveform shown in FIG. 4 permits to set the ratio of the selected pulse amplitude to the non-selected pulse amplitude to a desired value. In order to obtain a high contrast, it is necessary to set the bias near the maximum value in the range satisfying the formula (1).

The present invention provides the effect that the maximum contrast ratio can be obtained by selecting the maximum bias value within the range in which the ratio of the pulse peak value during selection and the pulse peak value during non-selection is above the ratio between the minimum pulse peak value at which one stable state of a ferroelectric liquid crystal changes completely to the other stable state and the peak value of the threshold value at which such a change does not occur.

What is claimed is:

1. A ferroelectric liquid crystal electro-optical device driven in time-sharing comprising; a ferroelectric liquid crystal layer having bi-stable alignment characteristics, means for converting the bi-stable aligment state to optical ON state or optical OFF state, a matrix electrode and means for driving the liquid crystal layer by applying voltages to the liquid crystal layer through the matrix electrode, a voltage sufficient to change a stable alignment state of the ferro-electric liquid crystal molecular being applied to a selected pixel, a voltage insufficient to change a stable alignment state being applied to a non-selected pixel, an AC voltage for holding a stable alignment state being applied to a half-selected pixel, a bias value, which is the ratio of the amplitude of said voltage applied to the selected pixel to the amplitude of said AC voltage applied to the half-selected pixel, being set near the maximum value of B satisfying the following formula $$B/(B-2) \geqq Vsat/Vth,$$

wherein Vsat is the minimum value of voltage which enables to change a stable alignment state to the other state and Vth is the maximum value of voltage which enables to hold said stable alignment state.

2. A device as claimed in claim 1; wherein Vsat is defined as a value in the range of voltage corresponding to 90% to 100% transmission light intensity of the electro-optical device.

3. A device as claimed in claim 1; wherein Vth is defined as a value in the range of voltage corresponding to 0% to 10% transmission light intensity of the electro-optical device.

4. A device as claimed in claim 1; wherein Vsat is defined as a value in the range of voltage corresponding to 90% to 100% transmission light intensity of the electro-optical device and Vth is defined as a value in the range of voltage corresponding to 0% to 10% transmission light intensity.

5. A device as claimed in claim 1; wherein Vsat is defined as a voltage corresponding to 100% transmission light intensity of the electro-optical device and Vth is defined as a voltage corresponding to 0% transmission light intensity.

6. A device as claimed in claim 1; wherein the ferroelectric liquid crystal is a chiral smectic one.

7. A device as claimed in claim 1; wherein the waveform of the voltage applied to the selected pixel comprises a former half having a reverse direction voltage and a latter half having a forward direction voltage.

8. A device as claimed in claim 1; wherein one frame comprises a first scanning for writing one of ON and OFF and a second scanning for writing the other.

9. A device as claimed in claim 1; wherein the A.C. voltage has no D.C. component.

10. A device as claimed in claim 1; wherein an interface of the ferroelectric liquid crystal layer is treated with a uniaxial orientation and the other interface is treated with a random homogeneous orientation.

11. A device as claimed in claim 1; wherein the electro-optical device is a display device.

12. A device as claimed in claim 1; wherein the electro-optical device is an optical shutter for a printer.

* * * * *